US012291025B2

(12) United States Patent
Taniguchi et al.

(10) Patent No.: US 12,291,025 B2
(45) Date of Patent: May 6, 2025

(54) PRINTING APPARATUS

(71) Applicant: BROTHER KOGYO KABUSHIKI KAISHA, Nagoya (JP)

(72) Inventors: Yoshimitsu Taniguchi, Tajimi (JP); Isao Kobayashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 54 days.

(21) Appl. No.: 18/061,018

(22) Filed: Dec. 2, 2022

(65) Prior Publication Data

US 2023/0202212 A1 Jun. 29, 2023

(30) Foreign Application Priority Data

Dec. 24, 2021 (JP) ................................. 2021-211492

(51) Int. Cl.
*B41J 11/00* (2006.01)
*B41J 11/42* (2006.01)
*B41J 11/66* (2006.01)
*B41J 11/70* (2006.01)

(52) U.S. Cl.
CPC ............ *B41J 11/0095* (2013.01); *B41J 11/42* (2013.01); *B41J 11/663* (2013.01); *B41J 11/70* (2013.01)

(58) Field of Classification Search
CPC ....... B41J 11/0095; B41J 11/42; B41J 11/663; B41J 11/70
See application file for complete search history.

(56) References Cited

U.S. PATENT DOCUMENTS 11,214,081 B2 * 1/2022 Miura .................... B41J 11/663

FOREIGN PATENT DOCUMENTS

JP 2003-231315 A 8/2003
JP 2018-186448 A 11/2018

* cited by examiner

*Primary Examiner* — Geoffrey S Mruk
(74) *Attorney, Agent, or Firm* — Scully, Scott, Murphy & Presser, PC

(57) ABSTRACT

A printing apparatus includes a holder which holds printing media, a conveying unit which conveys each of the printing media picked up from the holder, along a conveyance direction, a printing unit which prints an image on the printing media, a first detecting unit which detects a front end and a rear end in the conveyance direction of each of the printing media conveyed by the conveying unit, a processing unit which processes each of the printing media, by moving a processing member with the processing member contacting each of the printing media, and a controller configured to: calculate lengths of the printing media by using detected results by the first detecting unit; and based on the lengths of the printing media, set a processing position in the conveyance direction at which the processing unit processes each of the printing media.

12 Claims, 11 Drawing Sheets

PRINTING APPARATUS

REFERENCE TO RELATED APPLICATIONS

This application claims priority from Japanese Patent Application No. 2021-211492 filed on Dec. 24, 2021. The entire content of the priority application is incorporated herein by reference.

BACKGROUND ART

Conventionally, there is known an image formation apparatus provided with a cutting unit to cut a sheet of a regular size during a conveyance of the sheet for printing. For example, the image formation apparatus is configured to cut the sheet of the A3 size into halves to produce two sheets of the A4 size.

Sheets of a regular size used for printing have slight variations in size from sheet to sheet due to dimensional tolerance or the like. When processing such as cutting or the like is carried out on sheets of a standard regular size prescribed by ISO, the processing position is determined on the basis of the standard regular size. In the printing apparatus mentioned above, if the cutting position is determined to cut one sheet into halves on the basis of the standard regular size of the sheets, then a variation in size may arise between the cut sheets due to the variation in size caused by the dimensional tolerance or the like.

One aspect of the present disclosure is conceived in view of the above problem, and an object thereof is to reduce the variation in the length in a conveyance direction for a printing medium after such processing.

DESCRIPTION

According to an aspect of the present disclosure, there is provided a printing apparatus comprising:

- a holder configured to hold a plurality of printing media;
- a conveying unit configured to convey each of the printing media picked up from the holder, along a conveyance direction;
- a printing unit configured to print an image on the printing media according to a print data included in a print job;
- a first detecting unit configured to detect a front end and a rear end in the conveyance direction of each of the printing media conveyed by the conveying unit;
- a processing unit configured to process each of the printing media conveyed by the conveying unit, by moving a processing member with the processing member contacting each of the printing media; and
- a controller configured to:
  - calculate lengths of the printing media by using detected results by the first detecting unit, each of the lengths being a length in the conveyance direction of one of the printing media; and
  - based on the lengths of the printing media, set a processing position in the conveyance direction at which the processing unit processes each of the printing media.

FIRST EMBODIMENT

[Configuration of a Printing Apparatus]

Hereinbelow, referring to FIGS. 1 to 7, an explanation will be made on a printing apparatus 1 according to a first embodiment of the present disclosure. As exemplified by the arrows for the explanation with FIGS. 1 and 2, definitions are made for an up/down direction, a left/right direction, and a front/rear direction of the printing apparatus 1.

Figure 1:
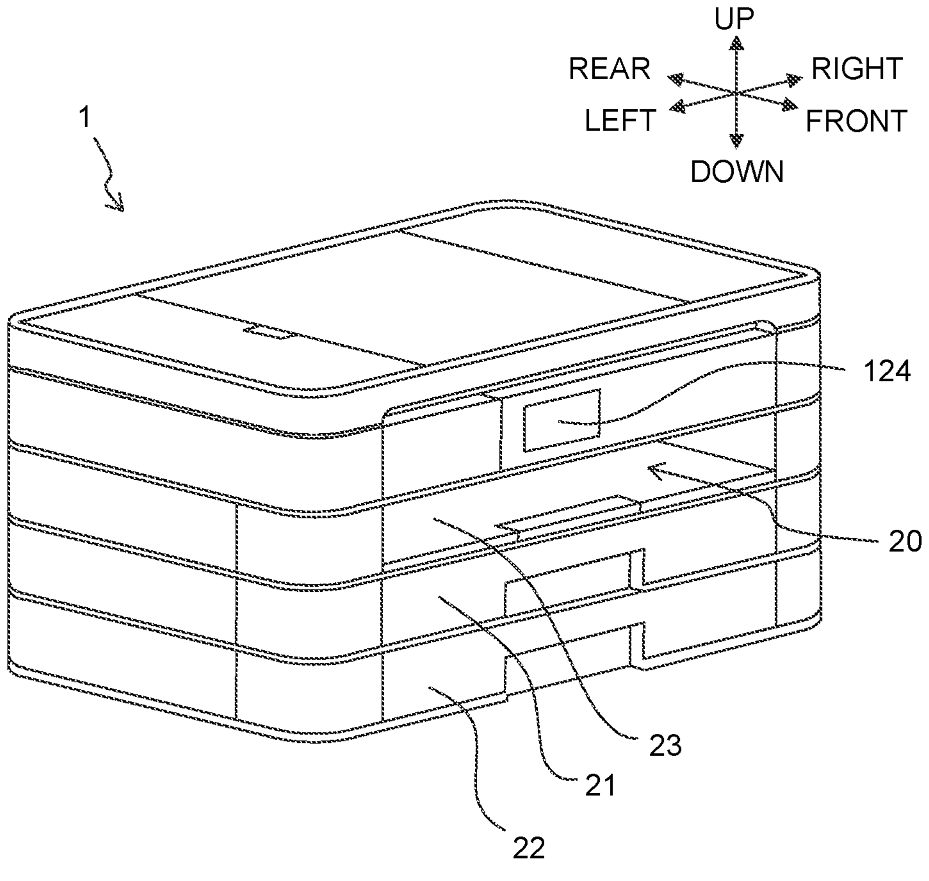
FIG. 1 depicts an outer appearance of a printing apparatus according to a first embodiment of the present disclosure.

The printing apparatus 1 depicted in FIG. 1 is an MFP (Multi-Function Peripheral) having a plurality of functions such as a printing function, a scanning function, and the like. The printing apparatus 1 has a printing function of an ink jet method to record images of a print data designated by a print job on a printing medium by discharging an ink for example. Note that the printing is not limited to the ink jet method but may be by an electro-photographic method. An image printed on the printing medium may be a color printable one or for dedicated monochrome printing. The printing medium is not limited to paper but may be, for example, a resin medium such as an OHP sheet.

As depicted in FIG. 1, an opening 20 is formed in the front side of the printing apparatus 1. In this opening 20, there are arranged feeding trays 21 and 22 being an example of the accommodating unit, and a discharging tray 23 which are all removable. The feeding trays 21 and 22 are the trays for accommodating a plurality of pieces of a printing medium, the upper surface thereof being open. In the example depicted in FIG. 1, the two feeding trays 21 and 22 are arranged to align vertically. The upper feeding tray 21 accommodates paper of the A4 size as an example of the first printing medium, while the lower feeding tray 22 accommodates paper of a letter size as an example of the second printing medium. Hereinbelow, the term "paper P" will be used to refer to the paper accommodated in the feeding tray 21 and the feeding tray 22.

Figure 4:
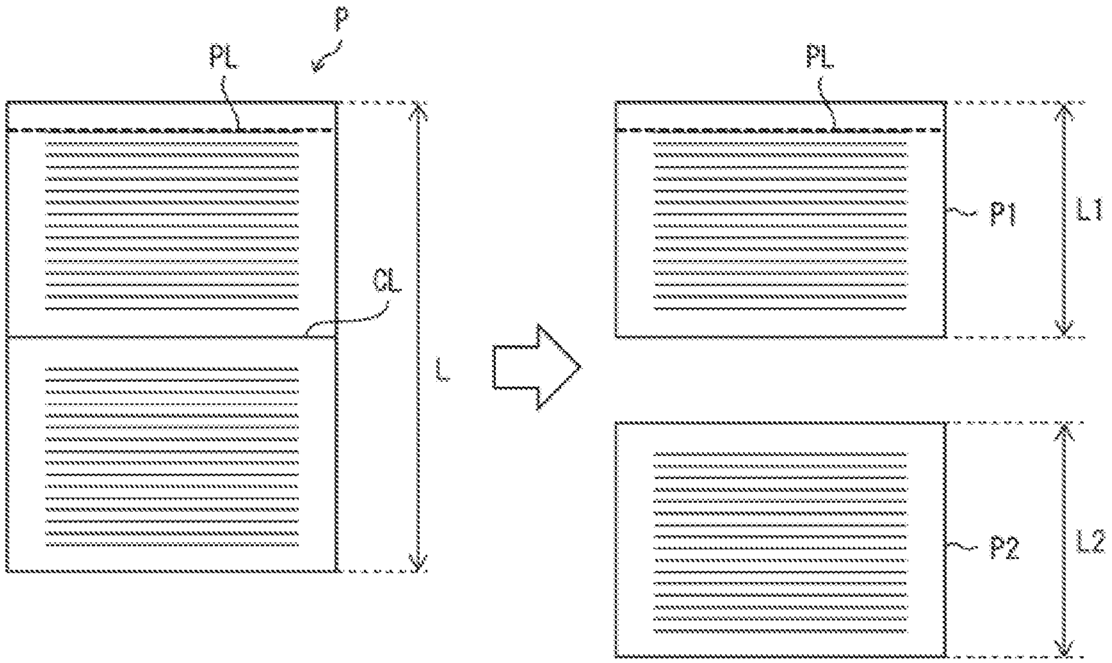
FIG. 4 depicts a piece of uncut paper, and first paper and second paper after cutting.

The paper P fed from the feeding tray 21 or the feeding tray 22 undergoes a cutting process as depicted in FIG. 4 after images are printed thereon by the printing function or the like of the printing apparatus 1. In the example of FIG. 4, the paper P is cut into halves to be divided into first paper P1 and second paper P2.

Above the feeding tray 21 and the feeding tray 22 depicted in FIG. 1, the discharging tray 23 is arranged with its upper surface being open. The first paper P1 and the second paper P2 are discharged to the discharging tray 23.

Further, as depicted in FIG. 1, an input interface 124 is provided on the front surface of the printing apparatus 1 to have a display screen. The input interface 124 is constructed from a touch panel, for example, and is configured to allow for various settings related to the printing of the printing apparatus 1 by way of a user's touch operation. The input interface 124 receives inputs for setting the size and the like of the paper P accommodated in the feeding tray 21 and the feeding tray 22, for example.

Figure 2:
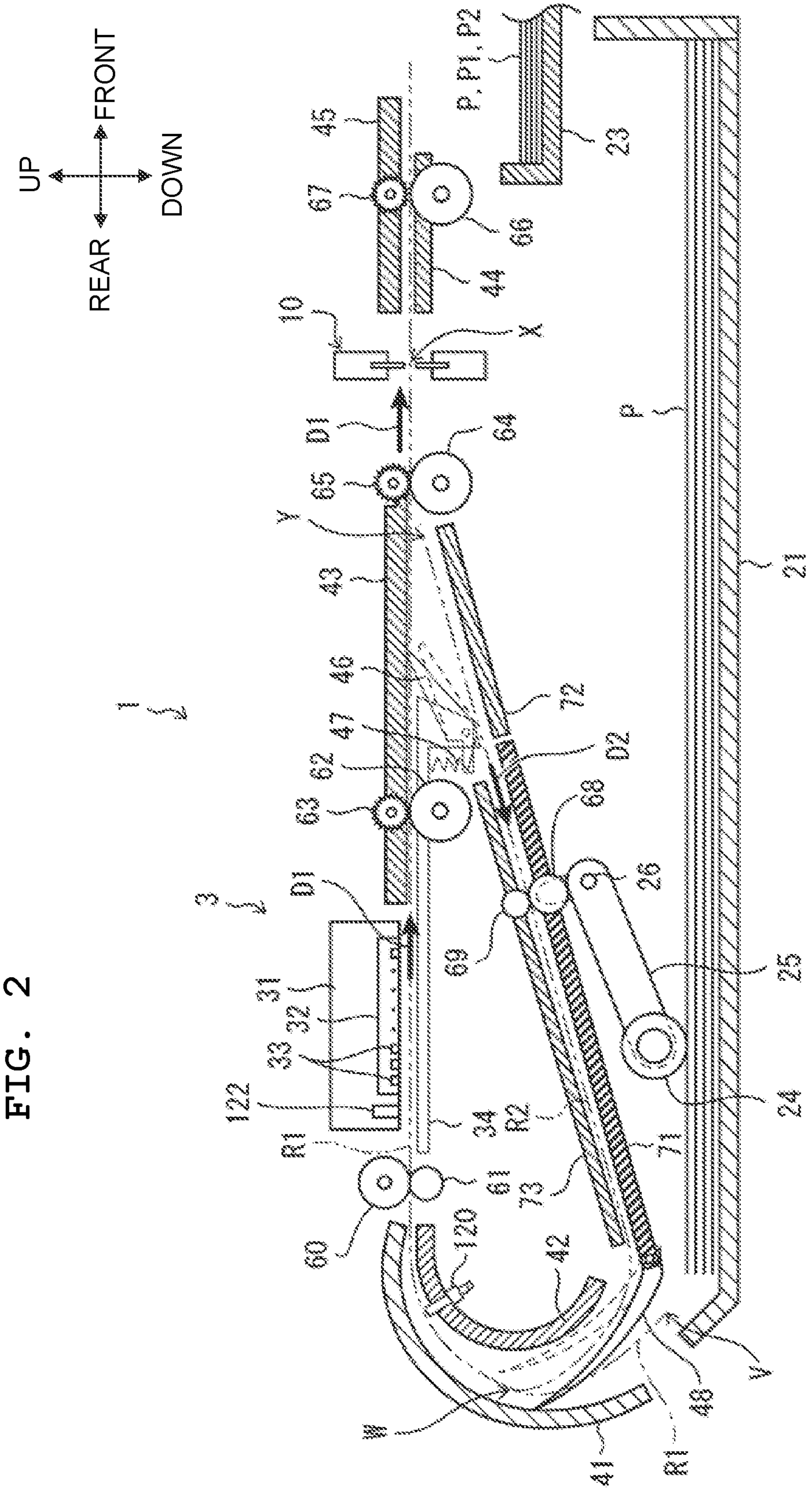
FIG. 2 is a cross section view depicting an internal structure of the printing apparatus according to the first embodiment.

As depicted in FIG. 2, the printing apparatus 1 includes the feeding tray 21, the discharging tray 23, a feed roller 24, a first conveyance path R1, a printing unit 3, conveyance rollers 60, 62, 64, 66, and 68, a first flap 46, a second flap 48, a second conveyance path R2, and a cutting unit 10. The feed roller 24, and the conveyance rollers 60, 62, 64, and 66 are an example of the first conveyor. Further, the conveyance rollers 64, 66, and 68 are an example of the second conveyor. Note that the number of rollers provided in the first conveyance path R1 and the second conveyance path R2 may be changed appropriately such as, for example, the conveyance roller 66 may be absent.

The feed roller 24 serves for feeding the paper P accommodated in the feeding tray 21 to a conveyance starting position V of the first conveyance path R1. The feed roller 24 is rotatably supported at the front end of a feeding arm 25. The feeding arm 25 is rotatably supported by a shaft 26 supported by a frame of the printing apparatus 1. The feed roller 24 rotates forward by the driving of a feed motor 107 depicted in FIG. 3. The forward rotation of the feed roller 24 serves to feed the paper P accommodated in the feeding tray 21 one by one to the conveyance starting position V of the first conveyance path RE The first conveyance path R1 refers to the space formed by guide members 41, 42, 43, 44, and 45, a platen 34, and the printing unit 3. The first conveyance path R1 extends from the feeding tray 21 to the discharging tray 23 via the printing unit 3. The first conveyance path R1 extends upward from the rear end of the feeding tray 21. The first conveyance path R1 is curved in an area defined by the guide members 41 and 42, extending linearly in an area defined by the guide members 43, 44, and 45, via the position of the printing unit 3. Hereinbelow, a first conveyance direction D1 will be used to refer to the direction for the paper P fed to the first conveyance path R1 to be conveyed frontward from the rear side of the printing apparatus 1.

The conveyance roller 60 is arranged at the upstream side of the printing unit 3 in the first conveyance path R1 in the first conveyance direction DE A pinch roller 61 is arranged in a position facing a lower part of the conveyance roller 60. The conveyance roller 60 is driven by a conveyance motor 108 depicted in FIG. 3. The pinch roller 61 rotates following the rotation of the conveyance roller 60. The forward rotations by the conveyance roller 60 and the pinch roller 61 covey the paper P to the printing unit 3, the paper P being nipped between the conveyance roller 60 and the pinch roller 61.

The printing unit 3 is provided between the conveyance roller 60 and the conveyance roller 62 in the first conveyance path R1 to print images on the paper P. The printing unit 3 has a carriage 31, a head 32, nozzles 33, and the platen 34. The head 32 is mounted on the carriage 31. The plurality of nozzles 33 are open in the lower surface of the head 32. The head 32 discharges ink droplets from the nozzles 33. The platen 34 is a rectangular plate-like member to place the paper P thereon. The paper P serves for the head 32 to print images thereon by way of selectively discharging ink droplets from the nozzles 33 onto the paper P supported on the platen 34, in the course of the movement of the carriage 31. The printing unit 3 starts printing on the paper P on the basis of a print starting position PL (see FIG. 4) set beforehand.

Figure 3:
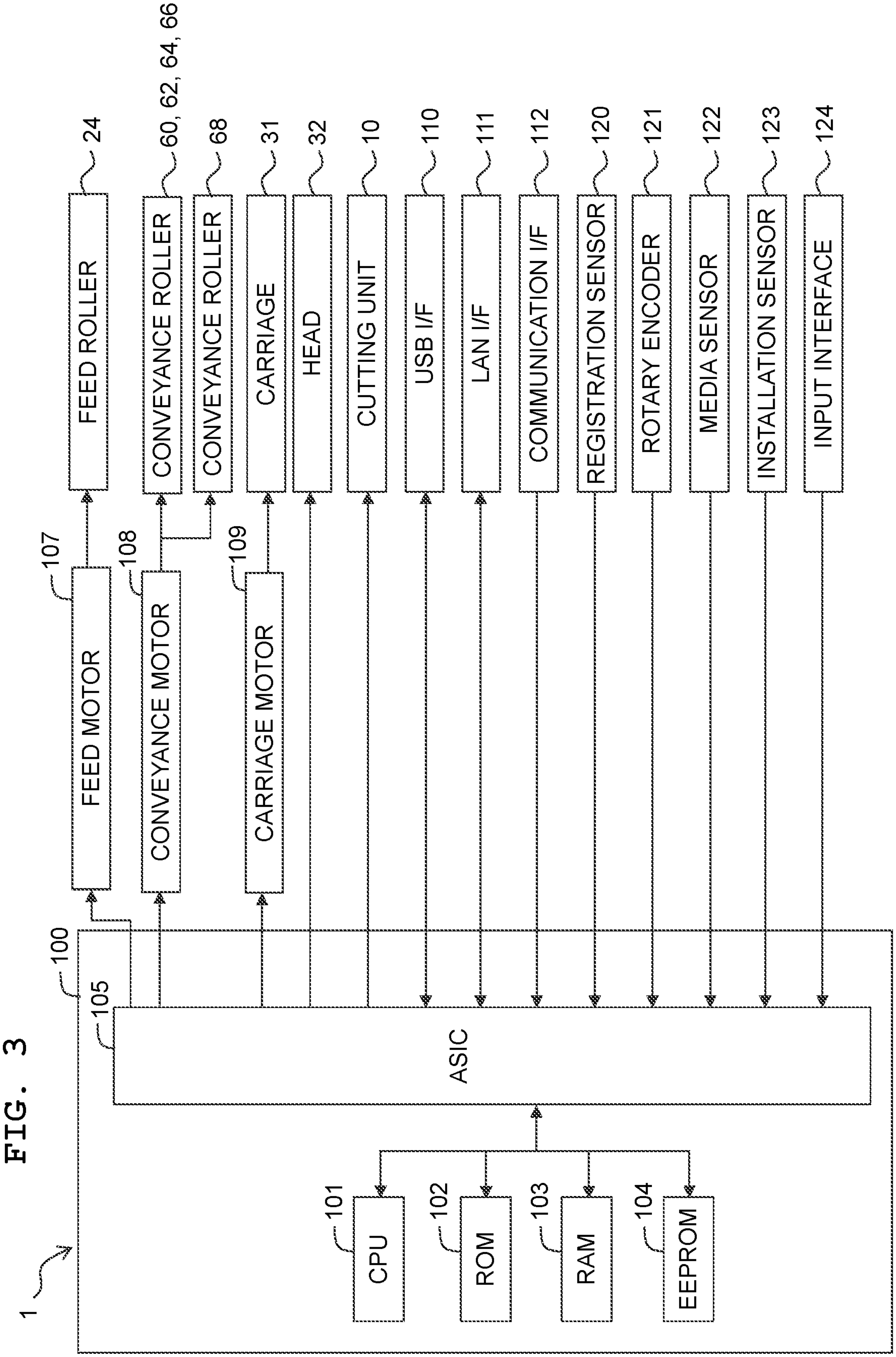
FIG. 3 is a block diagram depicting an electrical configuration of the printing apparatus according to the first embodiment.

The carriage 31 reciprocates in a direction orthogonal to the first conveyance direction D1, that is, in a width direction of the paper P, driven by a driving force transmitted from a carriage motor 109 depicted in FIG. 3. The controller 100 carries out printing on the paper P by repeating a printing process, and a returning process. In the printing process, one line on the paper P is printed by discharging an ink from the nozzles 33 while moving the carriage 31 in the width direction of the paper P when the paper P is stopped from being conveyed. In the returning process, the conveyance rollers 60 and 62 are driven to convey the paper P through a predetermined distance for beginning a new line.

As depicted in FIG. 2, the conveyance roller 62 is arranged at the downstream side of the printing unit 3 in the first conveyance path R1 in the first conveyance direction D1. A spur roller 63 is arranged in a position facing an upper part of the conveyance roller 62. The conveyance roller 62 is driven by the conveyance motor 108 depicted in FIG. 3. The spur roller 63 rotates following the rotation of the conveyance roller 62. The forward rotations by the conveyance roller 62 and the spur roller 63 covey the paper P downstream in the first conveyance direction D1, the paper P being nipped between the conveyance roller 62 and the spur roller 63.

Further, as depicted in FIG. 2, the conveyance roller 64 is arranged at the downstream side of the conveyance roller 62 in the first conveyance path R1 in the first conveyance direction D1. A spur roller 65 is arranged in a position facing an upper part of the conveyance roller 64. The conveyance roller 64 is driven by the conveyance motor 108. The spur roller 65 rotates following the rotation of the conveyance roller 64. The forward rotations by the conveyance roller 64 and the spur roller 65 covey the paper P to the cutting unit 10, the paper P being nipped between the conveyance roller 64 and the spur roller 65.

On the other hand, the backward rotations by the conveyance roller 64 and the spur roller 65 convey the paper P into the second conveyance path R2 along the lower surface of the first flap 46, the paper P being nipped between the conveyance roller 64 and the spur roller 65. Here, a second conveyance direction D2 is defined as the direction for the paper P conveyed into the second conveyance path R2 to move from the front side to the rear side of the printing apparatus 1, the direction being opposite to the first conveyance direction D1.

The first flap 46 is provided between the conveyance roller 62 and the conveyance roller 64 in the first conveyance path R1. The first flap 46 is arranged in the vicinity of a branch position Y facing the guide member 43. The first flap 46 is supported to be swingable between a first state and a second state on the platen 34. In the first state depicted with solid lines in FIG. 2, the first flap 46 is in contact with the guide member 43 to close up the first conveyance path R1. On the other hand, in the second state depicted with broken lines in FIG. 2, the first flap 46 is positioned below the first state to depart from the guide member 43 so as to let the paper P conveyed in the first conveyance direction D1 pass therethrough.

Further, the first flap 46 is biased upward by a coil spring 47. The coil spring 47 is connected to the first flap 46 at one end thereof, and connected to the platen 34 at the other end. The first flap 46 is biased by the coil spring 47 to be in the first state such that its front end is in contact with the guide member 43.

The cutting unit 10 is arranged between the conveyance roller 64 and the conveyance roller 66 in the first conveyance path R1. The cutting unit 10 is an example of the processing unit, serving to cut the paper P with a processing member such as a publicly know cutting unit mechanism or the like moving in the width direction of the paper P orthogonal to the first conveyance direction D1 while being in contact with the paper P.

As depicted in FIG. 4, by cutting the paper P, the first paper P1 and the second paper P2 are produced. FIG. 4 depicts an example of cutting the paper P into halves. The paper P is cut up in the width direction of the paper P by the cutting unit 10 at a cutting position CL in the first conveyance direction D1, to be divided into the first paper P1 and the second paper P2, the cutting position CL being set at the side along the first conveyance direction D1. For example, if the paper P is of the A4 size, then the first paper P1 and the second paper P2 are produced in the A5 size. Note that the paper P is fed into the first conveyance path R1 in the first conveyance direction D1 as if anterior to the first paper P1 and the second paper P2. In the following explanation, a length L of the paper P according to the first conveyance direction D1 may be referred to as paper length L. Further, a length L1 of the first paper P1 according to the first conveyance direction D1 may be referred to as paper length L1, while a length L2 of the second paper P2 in the first conveyance direction D1 may be referred to as paper length L2.

The conveyance roller 66 is arranged at the downstream side of the cutting unit 10 in the first conveyance path R1 in the first conveyance direction D1. A spur roller 67 is arranged in a position facing an upper part of the conveyance roller 66. The conveyance roller 66 is driven by the conveyance motor 108 depicted in FIG. 3. The spur roller 67 rotates following the rotation of the conveyance roller 66. By the forward rotations by the conveyance roller 66 and the spur roller 67, the paper P, the first P1 and the second paper P2 are discharged to the discharging tray 23.

As depicted in FIG. 2, in a junction position W between the first conveyance path R1 and the second conveyance path R2, the second flap 48 is arranged to swing. In particular, the second flap 48 is swingable between a first state depicted with solid lines in FIG. 2, and a second state depicted with broken lines in FIG. 2. When the second flap 48 is in the first state, part of the second conveyance path R2 is formed by the second flap 48 and the guide member 42. Further, when the second flap 48 is in the second state, part of the first conveyance path R1 is formed by the second flap 48 and the guide member 41.

A registration sensor 120 being an example of the first detector is provided at the upstream side of the conveyance roller 60 in the first conveyance path RE The registration sensor 120 serves to detect whether the front end or the rear end of the paper P passes over the position of contact with the conveyance roller 60. As the registration sensor 120, it is possible to use an optical sensor or a sensor having an actuator which swings if the paper P comes in contact therewith.

The conveyance roller 60 is provided with a rotary encoder 121 detecting the rotation of the conveyance roller 60. The rotary encoder 121 outputs a pulse signal to a controller 100 (see FIG. 3) according to the rotation of the conveyance roller 60. The rotary encoder 121 has an encoder disk and an optical sensor. The encoder disk rotates together with the conveyance roller 60. The optical sensor reads from the encoder disk in rotation to generate the pulse signal and outputs the generated pulse signal to the controller 100.

The printing unit 3 is provided with a media sensor 122. The media sensor 122 serves to detect whether or not the paper P is there on the platen 34. The media sensor 122 is used for detecting the arrival in the printing unit 3 of the front end of the paper P conveyed in the first conveyance path R1.

The second conveyance path R2 is defined by guide members 71, 72, and 73. The second conveyance path R2 is provided therein with the conveyance roller 68 and a pinch roller 69. The second conveyance path R2 branches from the branch position Y at the upstream side of the conveyance roller 64 in the first conveyance direction D1 in the first conveyance path R1, and is connected to the junction position W at the upstream side of the printing unit 3 in the first conveyance direction D1 in the first conveyance path R1.

The controller 100 causes the conveyance roller 64 to rotate backward while causing the conveyance roller 68 to rotate such that the paper P recorded with an image on one side is conveyed along the second conveyance direction D2 through the second conveyance path R2. The paper P conveyed in the second conveyance path R2 is conveyed into the first conveyance path R1 with its face and back reversed once at the junction position W. By virtue of this, the printing unit 3 can print images on both sides of the paper P.

[Electrical Configuration of the Printing Apparatus]

As depicted in FIG. 3, the printing apparatus 1 includes, in addition to the abovementioned members and units, the controller 100, the feed motor 107, the conveyance motor 108, the carriage motor 109, a USB interface 110 (I/F), a LAN interface 111 (I/F), a communication interface 112 (I/F), an installation sensor 123, and the input interface 124.

The controller 100 has a CPU (Central Processing Unit) 101, a ROM (Read Only Memory) 102, a RAM (Random Access Memory) 103, an EEPROM 104 (registered trademark), and an ASIC 105, which are all connected on an internal bus 106. The ROM 102 stores programs and the like for the CPU 101 to control various operations. The RAM 103 is used as a storing area to temporarily store data and signals used in executing the programs, or a working area for data processing. The EEPROM 104 stores, for example, a setting of the sizes of the paper P accommodated in the feeding tray 21 and the feeding tray 22, the setting being inputted by a user via the input interface 124. The controller 100 controls the feed motor 107, the conveyance motor 108, the carriage motor 109, the head 32, the cutting unit 10, and the like, on the basis of a control program read out from the ROM 102.

The ASIC 105 is connected with the feed motor 107, the conveyance motor 108, the carriage motor 109, the head 32, the cutting unit 10, the USB interface 110, the LAN interface 111, the communication interface 112, the registration sensor 120, the rotary encoder 121, the media sensor 122, the installation sensor 123 being an example of the second detector, and the input interface 124. The ASIC 105 supplies drive electric current to the feed motor 107, the conveyance motor 108 and the carriage motor 109. The controller 100 controls rotations of the feed motor 107, the conveyance motor 108, and the carriage motor 109 by way of, for example, PWM (Pulse Width Modulation) control.

Further, the controller 100 applies a drive voltage to vibrating elements of the head 32 to discharge ink droplets from the nozzles 33. Further, the ASIC 105 is connected with the registration sensor 120, the rotary encoder 121, the media sensor 122, and the installation sensor 123. Then, the controller 100 detects the state of the printing apparatus 1 on the basis of the signals outputted from the registration sensor 120, the rotary encoder 121, the media sensor 122, and the installation sensor 123.

The registration sensor 120 outputs an ON signal if the paper P has passed over the position of the registration sensor 120, but outputs an OFF signal if the paper P has not yet passed over the position of the registration sensor 120. That is, the registration sensor 120 outputs the ON signal during the period from the arrival of the front end of the paper P at the position of the registration sensor 120 to the passage of the rear end of the paper P over the position of the registration sensor 120, but outputs the OFF signal for the other periods. The detection signal due to the registration sensor 120 is outputted to the controller 100.

The controller 100 calculates the length L (the paper length L) of the paper P in the first conveyance direction D1 on the basis of the conveyance distance of the paper P detected by the rotary encoder 121, during the period from the time when the registration sensor 120 detects the front end of the paper P to the time when the registration sensor 120 detects the rear end of the paper P.

Note that if the speed for conveying the paper P is predetermined, then the controller 100 may calculate the conveyance distance of the paper P on the basis of the speed for conveying the paper P, and the time from the registration sensor 120 detecting the front end of the paper P to detecting the rear end of the paper P.

The installation sensor 123 is provided on the feeding tray 21 to detect whether or not the feeding tray 21 is installed in the opening 20 of the printing apparatus 1. The installation sensor 123 is an example of the second detector. If the feeding tray 21 is installed in the printing apparatus 1, then the installation sensor 123 outputs an ON signal to the controller 100, whereas if the feeding tray 21 is not installed in the printing apparatus 1, then the installation sensor 123 outputs an OFF signal to the controller 100. A physical sensor to detect the installation of the feeding tray 21 by contact with the feeding tray 21, an optical sensor having a light emitter and a light receiver, or the like can be used as the installation sensor 12. Note that instead of the installation sensor 123, another sensor may be provided as a third detector to detect that the paper P is not accommodated in the feeding tray 21.

The printing apparatus 1 is provided with the input interface 124 having the display screen. The input interface 124 is constructed from a touch panel, for example, and is configured to allow for various settings related to the printing of the printing apparatus 1 by way of the user's touch operation. The input interface 124 receives inputs for setting the size of the paper P and whether or not to carry out the cutting process. The information set by the input interface 124 is outputted to the controller 100.

The USB interface 110 is connected with a USB memory, a USB cable and the like. The LAN interface 111 is connected with a PC via a LAN cable. On receiving a print job, the controller 100 controls the respective units of the printing apparatus 1 via the USB interface 110 or the LAN interface 111 to print images on the paper P with the print data designated in the print job.

[Control Flow by the Controller]

Figure 6:
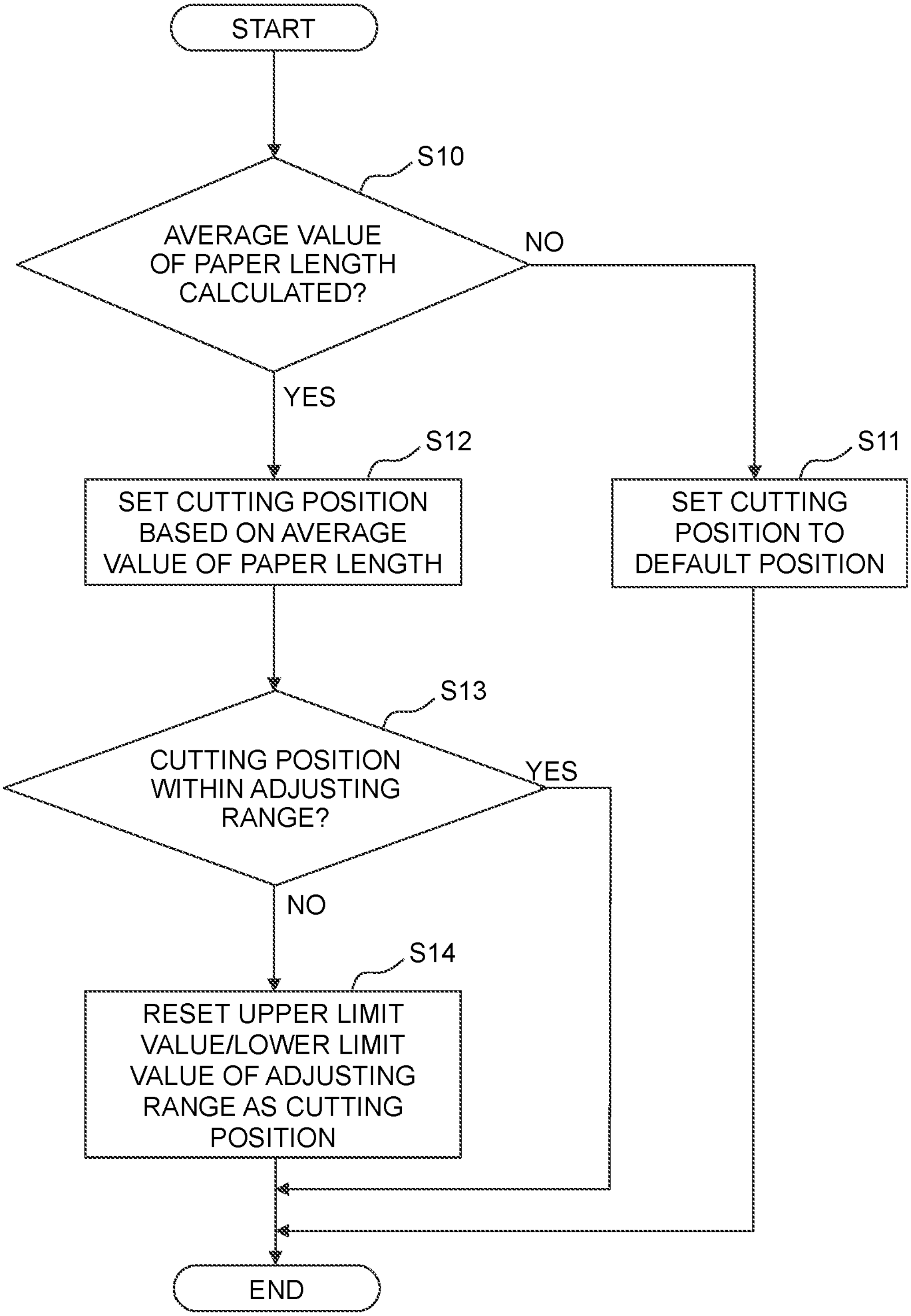
FIG. 6 is a flow chart depicting a setting process in FIG. 5.
Figure 7:
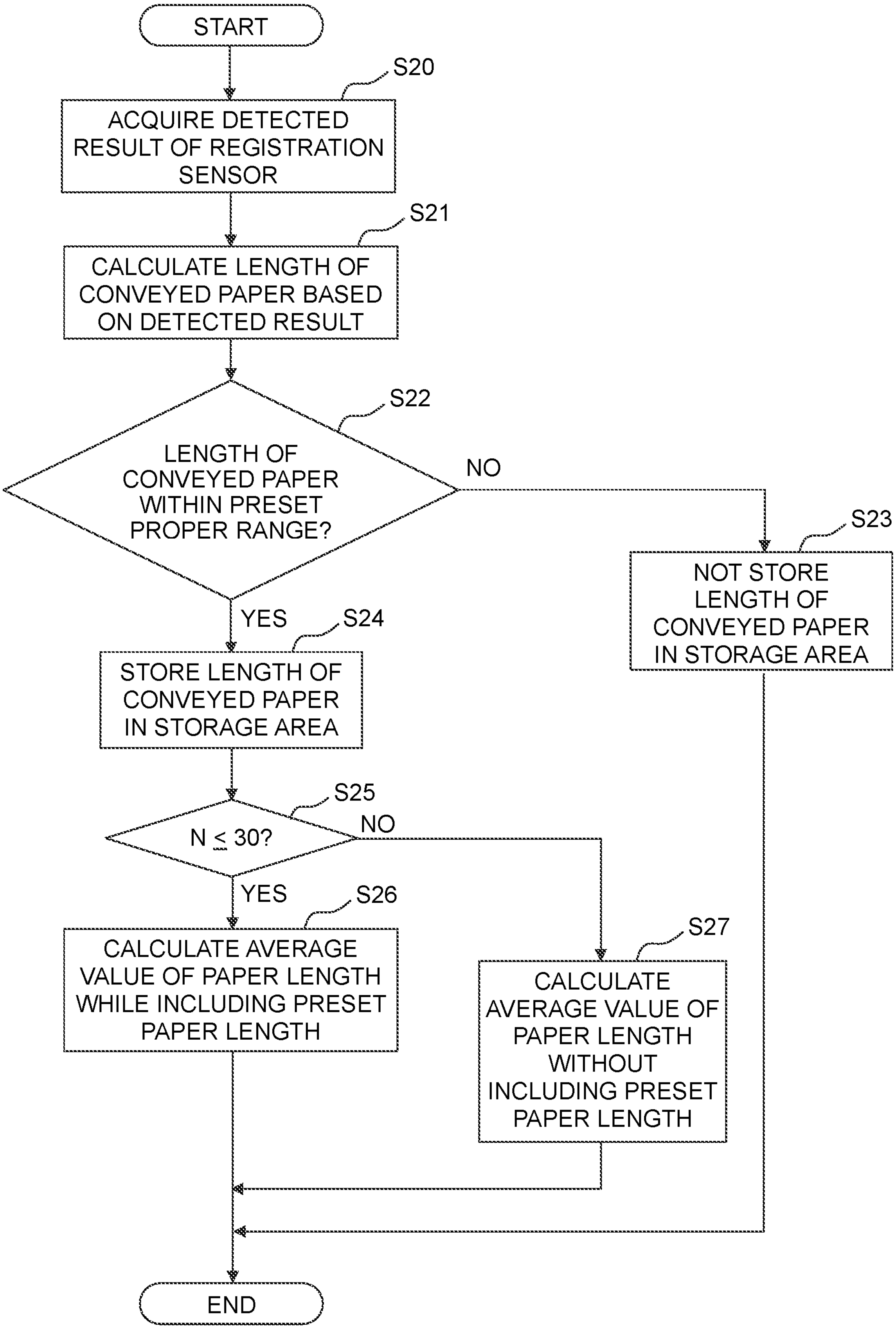
FIG. 7 is a flow chart depicting a length calculating process in FIG. 5.

Next, referring to the flow charts of FIGS. 5 to 7, an explanation will be made on a control flow presented by the controller 100 of the printing apparatus 1 according to the first embodiment. Note that the flow charts of FIGS. 5 to 7 are one example and thus the present disclosure is not limited thereto.

Figure 5:
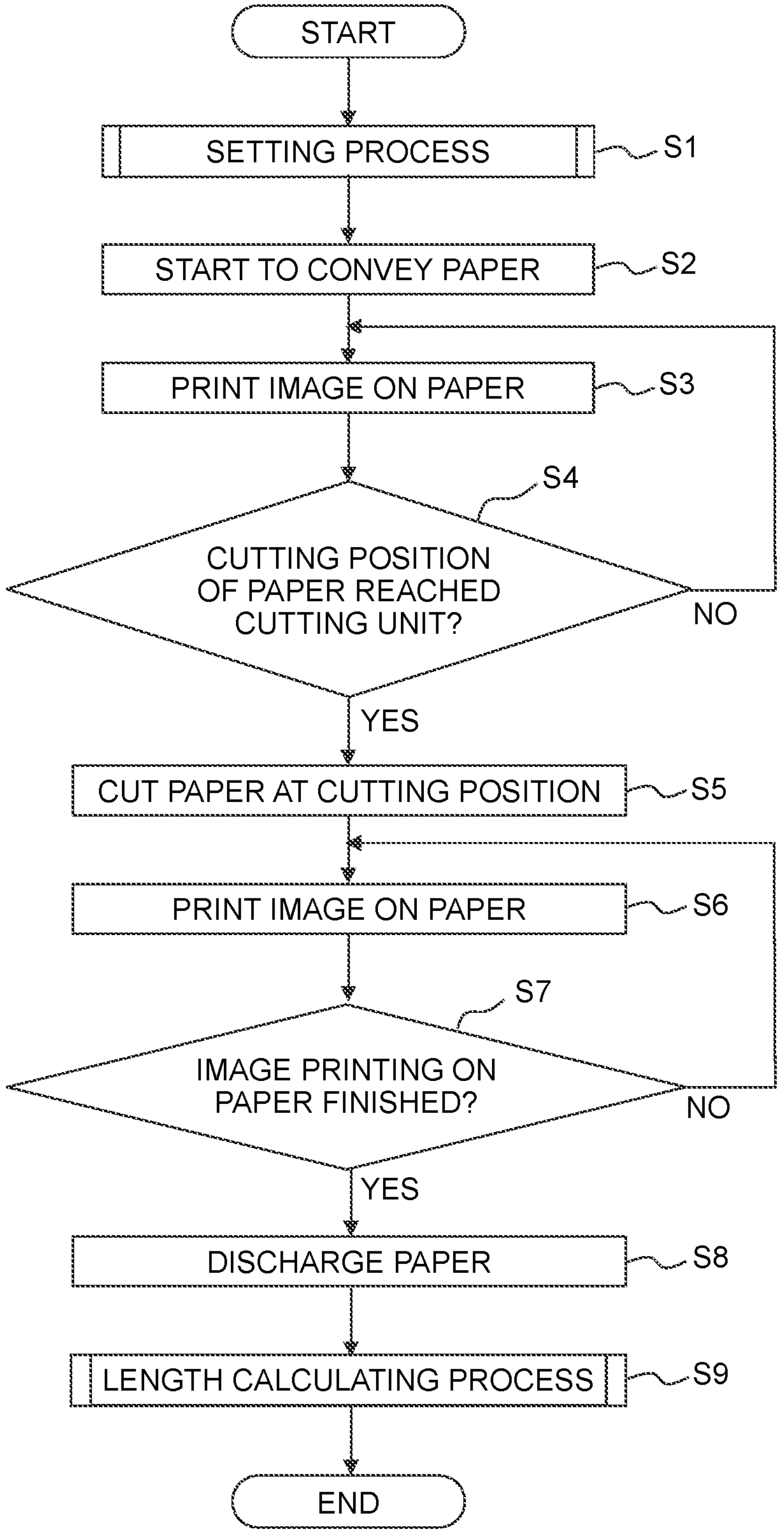
FIG. 5 is a flow chart depicting a control flow for a controller of the printing apparatus according to the first embodiment.

FIG. 5 depicts a process as one example of the printing process for the case of the print data included in the print job having two pages. The controller 100 carries out a single side printing according to the print data on the paper P fed from the feeding tray 21, and the cutting process on the paper P.

On receiving a print data via the USB interface 110 or the LAN interface 111, the controller 100 carries out a setting process which will be described later on using FIG. 6, to set the cutting position CL in the paper Pin the first conveyance direction D1 (S1).

Finished with setting the cutting position CL, the controller 100 starts to convey the paper P (S2). The controller 100 drives the feed motor 107 to rotate the feed roller 24 forward so as to take out the paper P from the feeding tray 21. Thereafter, under the control of the controller 100, the paper P is conveyed in the first conveyance path R1 along the first conveyance direction D1. If the front end of the paper P being conveyed passes over the position of the registration sensor 120, then the registration sensor 120 starts to output the ON signal to the controller 100.

The controller 100 drives the conveyance motor 108 to rotate the conveyance roller 60 and the like forward so as to convey the paper P to the printing unit 3. The printing unit 3 prints one line of the image on the paper P from the print starting position PL, under the control of the controller 100 (S3). If the printing unit 3 is finished with printing the one line, then the controller 100 drives the conveyance motor 108 to rotate the conveyance rollers 60 and 62 and the like so as to carry out the returning process.

In the returning process, the controller 100 determines whether or not the cutting position CL of the paper P has reached a position X of the cutting unit 10 (S4). If the controller 100 determines that the cutting position CL of the paper P has reached the position X of the cutting unit 10 (S4: Yes), then the controller 100 controls the cutting unit 10 to cut the paper P at the cutting position CL (S5). This cutting process divides the paper P into the first paper P1 and the second paper P2. If the controller 100 determines that the cutting position CL of the paper P has not reached the position X of the cutting unit 10 (S4: No), then the controller 100 causes the printing unit 3 to print the next line of the image on the paper P (S3).

After the cutting process in the step S5, the controller 100 drives the conveyance motor 108 to rotate the conveyance rollers 60, 62, 64, and 66 to convey the first paper P1 and the second paper P2 after the cutting process along the first conveyance path RE Due to this conveyance, the first paper P1 is discharged to the discharging tray 23.

Successively after the cutting process, the controller 100 causes the printing unit 3 to print the image on the second paper P2 (S5). The controller 100 causes the printing unit 3 to carry out the image printing on the second paper P2 (S6) until the image printing on the second paper P2 is finished (S7: No). If the image printing on the second paper P2 is finished (S7: Yes), then the second paper P2 is discharged to the discharging tray 23 (S8).

During the controller 100 carrying out the process from the step S2 to the step S8, if the rear end of the paper P passes over the position of the registration sensor 120, then the output from the registration sensor 120 to the controller 100 switches from the ON signal to the OFF signal. The controller 100 calculates the length L (the paper length L) of the paper P in the first conveyance direction D1 on the basis of the conveyance distance of the paper P detected by the rotary encoder 121 during the ON signal being outputted from the registration sensor 120, and then causes the EEPROM 104 to store the result. The controller 100 calculates an average value Lave from the calculated results of the lengths L in the first conveyance direction D1 of a plurality of pieces of the paper P stored in the EEPROM 104 (S9). The details of the step S9 will be described later on using FIG. 7. In the following explanation, the average value Lave of the lengths L of the paper P in the first conveyance direction D1 may be referred to as average paper length Lave.

In the above, the explanation was made with the case of the print job including the print data of printing two pages. However, the printing process depicted in FIG. 5 can be carried out for a case of including only one page in a print data or a case of including three pages or more in a print data. If a print job includes only one page in the print data, then the controller 100 may let the process proceed to the step S8 after the step S5 of the cutting process. Further, if a print job includes three pages or more in the print data, then the controller 100 may repeat the process depicted in FIG. 5 until the printing process is finished with all pages of the print data. In carrying out the printing process for the print data from the third page and the following pages, it is possible to set the cutting position CL by using the average paper length Lave updated in the printing process for the previous two pages.

(Setting Process)

In a setting process S1 depicted in FIG. 6, the controller 100 determines whether or not the average paper length Lave of the lengths L of the paper P is calculated (S10). In other words, the controller 100 determines whether or not the EEPROM 104 stores the average paper length Lave calculated in an aftermentioned length calculating process in detail.

The controller 100 sets the cutting position CL of the paper P based on the average paper length Lave (S12) if the average paper length Lave is calculated (S10: Yes). For example, the controller 100 sets the cutting position CL based on the following formula (1).

$$CL = C\mathrm{def} + (L\mathrm{ave} - L\mathrm{def})/2 \qquad (1)$$

Here, Cdef is the default value of the cutting position CL, expressing the default processing position. Ldef is the default value of the length L of the paper P in the first conveyance direction D1. The values of Cdef and Ldef may be stored in advance in the ROM 102 or the like in the stage of manufacturing the printing apparatus 1 by referring to the standard size of the paper P, or may be set on the basis of the user's input via the input interface 124 and then stored in the EEPROM 104.

On the other hand, if the average paper length Lave is not calculated (S10: No), then the controller 100 sets the cutting position CL to the default processing position Cdef (S11). The case where the average paper length Lave is not calculated refers to, for example, the length L of the paper P in the first conveyance direction D1 is not measured even once, such that the controller 100 sets the cutting position CL to the default processing position Cdef.

After setting the cutting position CL in the step S12, the controller 100 determines whether or not the cutting position CL is within an adjusting range (S13). The adjusting range refers to a range with the cutting position CL allowed as the center of the length of the paper P in the first conveyance direction D1. When the feeding tray 21 accommodates paper of a regular size such as paper of the A4 size, there may be still a variation in size according to each piece of the paper due to a size error or the like. Further, even with the paper of the same regular size, there may be a variation in the paper size according to the paper type, manufacturing lot, or the like. Further, in the result of measuring the paper length by using the registration sensor 120, there may be an insufficient accuracy of the measurement, so as to bring a variation into the measuring result. Furthermore, the value of the average paper length Lave may not be appropriately used to set the cutting position CL due to various factors such as in case a user has mistakenly mixed the paper of a plurality of regular sizes into the feeding tray 21, part of the paper is damaged, or the like. The adjusting range is predetermined in view of those situations. The upper limit and the lower limit of the adjusting range may be stored in the ROM 102 or the like at the stage of designing the printing apparatus 1, or may be set on the basis of the user's input via the input interface 124 and then stored in the EEPROM 104.

If the controller 100 determines that the cutting position CL is within the adjusting range (S13: Yes), then the value of the cutting position CL is maintained. On the other hand, if the controller 100 determines that the cutting position CL is not within the adjusting range (S13: No), then the upper limit or the lower limit of the adjusting range is reset as the cutting position CL (S14). In particular, if the cutting position CL set in the step S12 is smaller than the lower limit value of the adjusting range, then the cutting position CL is reset to the lower limit value of the adjusting range. On the other hand, if the cutting position CL set in the step S12 is larger than the upper limit value of the adjusting range, then the cutting position CL is reset to the upper limit value of the adjusting range.

By setting the cutting position CL appropriately as exemplified in FIG. 6, it is possible to reduce the difference between the paper length L1 of the first paper P1 and the paper length L2 of the second paper P2 within the adjusting range. Further, if a plurality of pieces of the paper P are cut up, then it is possible to reduce the variation in paper length between the plurality of pieces of the first paper P1 and the plurality of pieces of the second paper P2 resulted from the cutting.

(Length Calculating Process)

In the length calculating process depicted in FIG. 7, the controller 100 acquires the detected result of the registration sensor 120 (S20). In particular, the controller 100 acquires information about a timing t1 at which the registration sensor 120 detects the front end of the paper P, and information about a timing t2 at which the registration sensor 120 detects the rear end of the second paper P2. In other words, the controller 100 acquires the information about a time period during which the registration sensor 120 was outputting the ON signal.

Next, the controller 100 calculates the paper length L of the paper P on the basis of the result detected by the registration sensor 120 and acquired in the step S20 (S21). In particular, the controller 100 acquires a conveyance distance A of the paper P detected by the rotary encoder 121 over the time from t1 to t2 during which the registration sensor 120 was outputting the ON signal, and calculates the paper length L of the paper P on the basis of the conveyance distance A. For example, the controller 100 calculates the paper length L of the paper P by performing a correction according to the conveyance speed A/(t2−t1) of the paper P for the conveyance distance A.

If the paper length L of the paper P is calculated, then the controller 100 determines whether or not its value is within a preset range (S22). The preset range mentioned here refers to a range preset in consideration of a size error and the like of paper of a regular size, in the same manner as the adjusting range of the cutting position CL mentioned earlier on. If the value of the paper length L of the paper P is within the preset range (S22: Yes), then the controller 100 lets the EEPROM 104 or the like store the value of the paper length L of the paper P in the storage area (S24) in order to use the same in computation of the average paper length Lave, and. The EEPROM 104 can store a plurality of the calculated results of the paper lengths L of the paper P as a history such as, for example, in a data structure such as an articulated list structure. If the process of the EEPROM 104 storing the paper length L of the paper P is finished, then the controller 100 determines whether or not the number of data of the paper length L of the paper P is a predetermined number N or less stored in the EEPROM 104 (S25). For example, the controller 100 determines whether or not the number of data of the paper length L of the paper P is 30 or less stored in the EEPROM 104. If the number of data of the paper length L of the paper P is 30 or less stored in the EEPROM 104 (S25: Yes), then the controller 100 calculates the average paper length Lave including a preset default paper length of the paper P (S26). The preset default paper length of the paper P refers to the paper length related to the printing medium size (such as the A4 size) of the paper P designated in the print job, such as, for example, the aforementioned Ldef. For example, if the EEPROM 104 stores three data of the paper lengths L of the paper P, then the controller 100 calculates the average paper length Lave by using those three data and the default paper length Ldef of the paper P. On the other hand, if the number of data of the paper lengths L of the paper P is more than 30 stored in the EEPROM 104 (S25: No), then the controller 100 calculates the average paper length Lave as the average value of the data of the latest 30 paper lengths L of the paper P, without including the preset default paper length of the paper P (S27). Thereafter, the controller 100 uses the newly calculated result as the value of the average paper length Lave. For example, the controller 100 substitutes the newly calculated average paper length Lave into the above formula (1) in setting the cutting position CL. In this manner, by using the calculated result of the paper length L of the paper P conveyed the latest to update the value of the average paper length Lave, it is possible to prevent the cutting precision from decrease through resetting the cutting position CL of the paper P every time.

On the other hand, in the determination of the step S22, if the controller 100 determines that the paper length L of the paper P is not within the preset range, that is, out of the range (step S22: No), then the EEPROM 104 or the like does not store the paper length L of the paper P in the storage area (S23). The controller 100 does not update the average paper length Lave but ends the process. In this manner, if the calculated result of the average paper length Lave of the paper P conveyed the latest is not within the preset range, then without using the paper length L in calculating the average paper length Lave, it is possible to prevent the cutting precision from decrease due to using an inappropriately measured result.

According to the first embodiment explained above, the controller 100 uses the result of the registration sensor 120 detecting the front end and the rear end of the paper P to carry out a process including: the length calculating process S9 of calculating the paper length L of the paper Pin the first conveyance direction D1, and the setting process S1 of setting the cutting position CL in the first conveyance direction D1 for the cutting unit 10 to perform a cutting process on the paper P, on the basis of the paper lengths L of a plurality of pieces of paper P in the first conveyance direction D1 calculated in the length calculating process S9. Because the cutting position CL is set on the basis of the paper lengths L of a plurality of pieces of the paper P in the first conveyance direction D1, the variations in the paper lengths L of the paper P due to a size common difference or the like are averaged such that it is possible to reduce the variation between the paper length L1 of the first paper P1 and the paper length L2 of the second paper P2 after the cutting process. Further, even if the registration sensor 120 does not have a sufficient detecting precision so as to give rise to a variation in the detected results, by setting the cutting position CL on the basis of the paper lengths L of the plurality of pieces of the paper P in the first conveyance direction D1, it is still possible to reduce the variation between the paper length L1 of the first paper P1 and the paper length L2 of the second paper P2 after the cutting process.

According to the first embodiment explained above, in the setting process of FIG. 6, the controller 100 sets the cutting position CL on the basis of the average paper length Lave of the paper lengths L of a plurality of pieces of the paper P (S12). Therefore, the variations in the paper lengths L of the paper P due to a size common difference or the like are averaged such that it is possible to reduce the variation between the paper length L1 of the first paper P1 and the paper length L2 of the second paper P2 after the cutting process.

According to the first embodiment explained above, in the setting process of FIG. 6, if the number of calculated results of the paper lengths L in the length calculating process is a predetermined number or less (S25: Yes), then the controller 100 sets the cutting position CL on the basis of the paper lengths L of the paper P calculated in the length calculating process and the length Ldef preset for the paper P designated in the print job. Therefore, in case some paper or the like of an incorrect size according to the standard is mixed in, it is still possible to prevent setting the cutting position inappropriately for the correct size according to the standard.

According to the first embodiment explained above, if the paper length L of the paper P calculated in the length calculating process is not within the preset range (step S22: No in FIG. 7), then the controller 100 does not use the paper lengths L of the paper P for calculating the average paper length Lave by (the step S24 in FIG. 7). Then, in the setting process, without using the length of the printing medium not included in the preset range, the controller 100 sets the cutting position CL on the basis of the calculated average paper length Lave (step S12 in FIG. 6). Therefore, in case some paper or the like of an incorrect size according to the standard is mixed in, it is still possible to prevent setting the cutting position inappropriately for the correct size according to the standard.

According to the first embodiment explained above, if the cutting position CL set in the setting process in FIG. 6 is not within the preset adjusting range (S13: No), then the controller 100 sets the cutting position CL to the upper limit or the lower limit position in the adjusting range. Therefore, for example, even in case the paper length L is calculated as beyond the allowable error for the standard size of the paper P designated in the print job, etc., the cutting position CL will still not come out of the adjusting range for cutting the paper P in the following step.

SECOND EMBODIMENT

Next, referring to FIGS. 8A and 8B, an explanation will be made on a control flow presented by the controller 100 of the printing apparatus 1 according to a second embodiment.

Figure 8A:
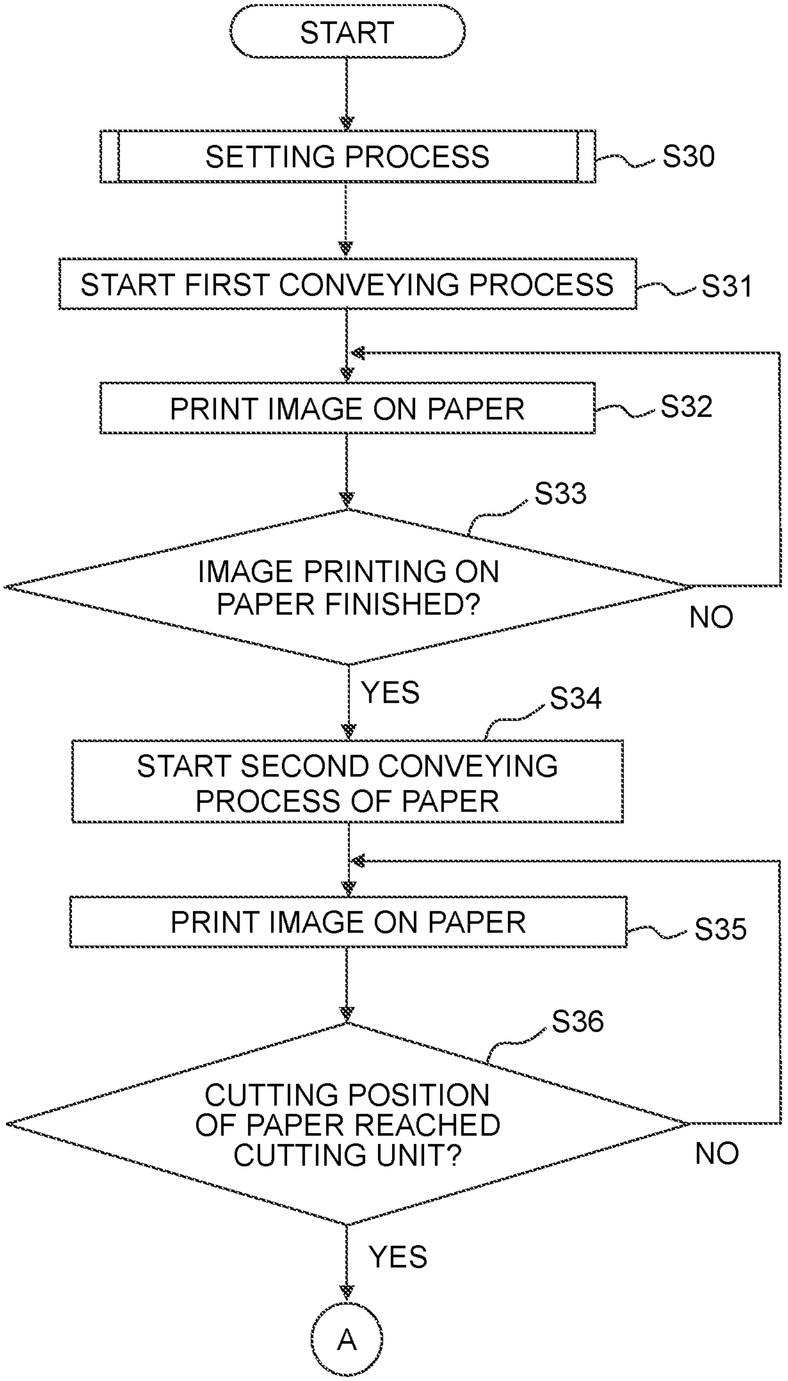
FIGS. 8A and 8B are a flow chart depicting a control flow for the controller of the printing apparatus according to a second embodiment.
Figure 8B:
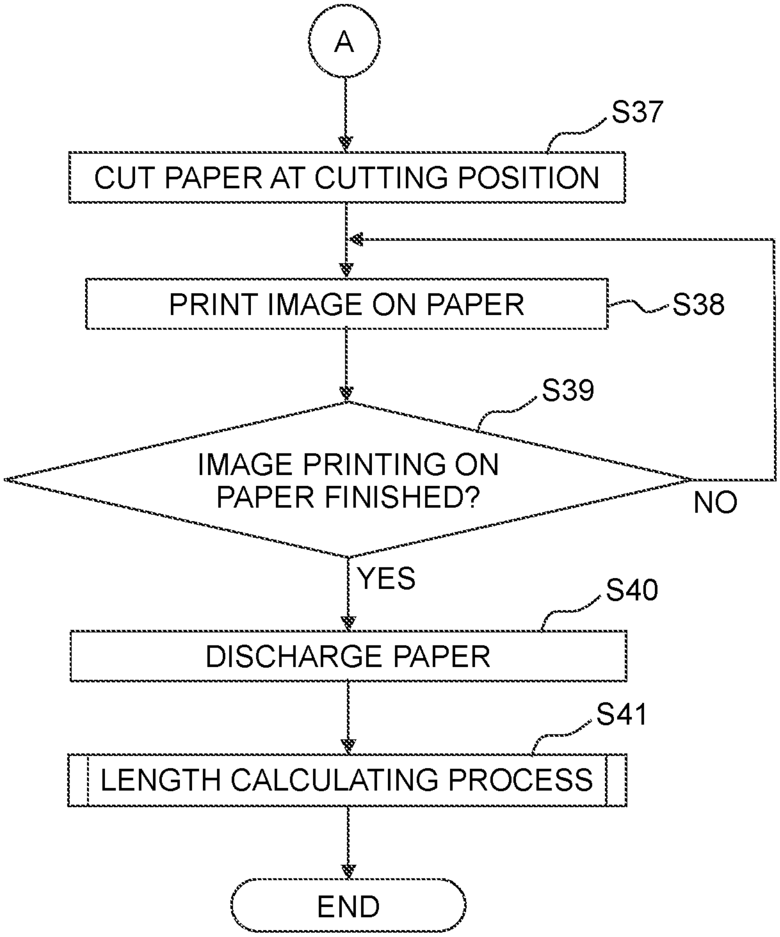

FIGS. 8A and 8B are a flow chart depicting the control flow according to a printing process for the printing apparatus 1 to carry out on the paper P. As one example of the printing process, the print job includes a print data of four pages to print on the paper P fed from the feeding tray 21 by carrying out double side printing according to the print data. This aspect is different from FIG. 5.

On receiving a print data via the USB interface 110 or the LAN interface 111, the controller 100 carries out the setting process which was described in the first embodiment using FIG. 6, to set the cutting position CL in the paper P (S30).

Finished with setting the cutting position CL, the controller 100 starts to convey the paper P (S31) accommodated in the feeding tray 21 in the same manner as in the step S2 in FIG. 5. The term "first conveying process" will be used to refer to the conveying process of the paper P started in the step S31. In the first conveying process, the controller 100 drives the feed motor 107 to rotate the feed roller 24 forward so as to take out the paper P from the feeding tray 21. Thereafter, under the control of the controller 100, the paper P is conveyed in the first conveyance path R1 along the first conveyance direction D1. If the front end of the paper P being conveyed passes over the position of the registration sensor 120, then the registration sensor 120 starts to output the ON signal to the controller 100.

The controller 100 drives the conveyance motor 108 to rotate the conveyance roller 60 and the like forward so as to convey the paper P to the printing unit 3. The printing unit 3 prints one line of the image on the paper P from the print starting position PL, under the control of the controller 100 (S32). If the printing unit 3 is finished with printing the one line, then the controller 100 drives the conveyance motor 108 to rotate the conveyance rollers 60, 62, 64, and 66, and the like so as to carry out the returning process.

The controller 100 determines whether or not the image printing is finished with the face side of the paper P (S33). That is, the controller 100 determines whether or not the image printing is finished with the first page and the second page on the face side of the paper P in the print data including four pages in the print job. If the printing is not finished (step S33: No), then the controller 100 causes the process to return to the step S32, to repeat the image printing and the returning process on the face side of the paper P until the printing is finished.

If the rear end of the paper P passes over the position of the registration sensor 120, then the input from the registration sensor 120 to the controller 100 switches to the OFF signal. Further, if the rear end of the paper P passes over the position of the conveyance roller 62, then the controller 100 determines that the image printing on the face side of the paper P is finished (step S33: Yes), and the process proceeds to the step S34. In the step S34, because the controller 100 starts to print the image on the back side of the paper P, the second conveying process is started. The controller 100 drives the conveyance motor 108 to rotate the conveyance rollers 64 and 66 backward so as to convey the paper P along the lower surface of the first flap 46 into the second conveyance path R2. The controller 100 drives the conveyance motor 108 to rotate the conveyance rollers 64, 66, and 68 to convey the paper P in the second conveyance direction D2 opposite to the first conveyance direction D1. When the paper P is conveyed up to the junction position Won the second conveyance path R2, the paper P joins to the first conveyance path R1. On this occasion, the face side and the back side of the paper P are reversed in contrast to the occasion of being conveyed through the first conveyance path R1 in the first conveying process.

The controller 100 drives the conveyance motor 108 to rotate the conveyance roller 60 and the like forward so as to convey the paper P joined into the first conveyance path R1 to the printing unit 3. The printing unit 3 prints one line of the image on the paper P from the print starting position PL, under the control of the controller 100 (S35). If the printing unit 3 is finished with printing the one line, then the controller 100 drives the conveyance motor 108 to rotate forward the conveyance rollers 60, 62, 64, and 66 and the like so as to carry out the returning process.

In the returning process, the controller 100 determines whether or not the cutting position CL of the paper P has reached the position X of the cutting unit 10 (S36). If the controller 100 determines that the cutting position CL of the paper P has reached the position X of the cutting unit 10 (S36: Yes), then the controller 100 controls the cutting unit 10 to cut the paper P at the cutting position CL (S37). This cutting process divides the paper P into the first paper P1 and the second paper P2. If the controller 100 determines that the cutting position CL of the paper P has not reached the position X of the cutting unit 10 (S36: No), then the controller 100 causes the printing unit 3 to print the next line of the image on the paper P (S35).

After the cutting process in the step S37, the controller 100 drives the conveyance motor 108 to rotate the conveyance rollers 60, 62, 64, and 66 to convey the first paper P1 and the second paper P2 after the cutting process along the first conveyance path RE Due to this conveyance, the first paper P1 is discharged to the discharging tray 23.

Successively after the cutting process, the controller 100 causes the printing unit 3 to print the image on the second paper P2 (S38). The controller 100 causes the printing unit 3 to carry out the image printing on the second paper P2 (S38) until the image printing on the second paper P2 is finished (S39: No). If the image printing on the second paper P2 is finished (S39: Yes), then the second paper P2 is discharged to the discharging tray 23 (S40).

If the second paper P2 is discharged to the discharging tray 23, then the controller 100 causes the process to proceed to the step S41. In the step S41, the controller 100 carries out the length calculating process S9 to calculate the average paper length Lave in the same manner as in the step S9 of FIG. 5.

In the above, the explanation was made with the case of the print job including the print data of printing four pages. However, the printing process depicted in FIGS. 8A and 8B can be carried out for a case of including five pages or more in a print data. If a print job includes five pages or more in the print data, then the controller 100 may repeat the process depicted in FIGS. 8A and 8B until the printing process is finished with all pages of the print data.

As explained above in the second embodiment, it is also possible to apply the present disclosure to carrying out double side printing on the paper P.

THIRD EMBODIMENT

Next, referring to FIGS. 9A and 9B, an explanation will be made on a control flow presented by the controller 100 of the printing apparatus 1 according to a third embodiment.

[Control Operation by the Controller]

Figure 9A:
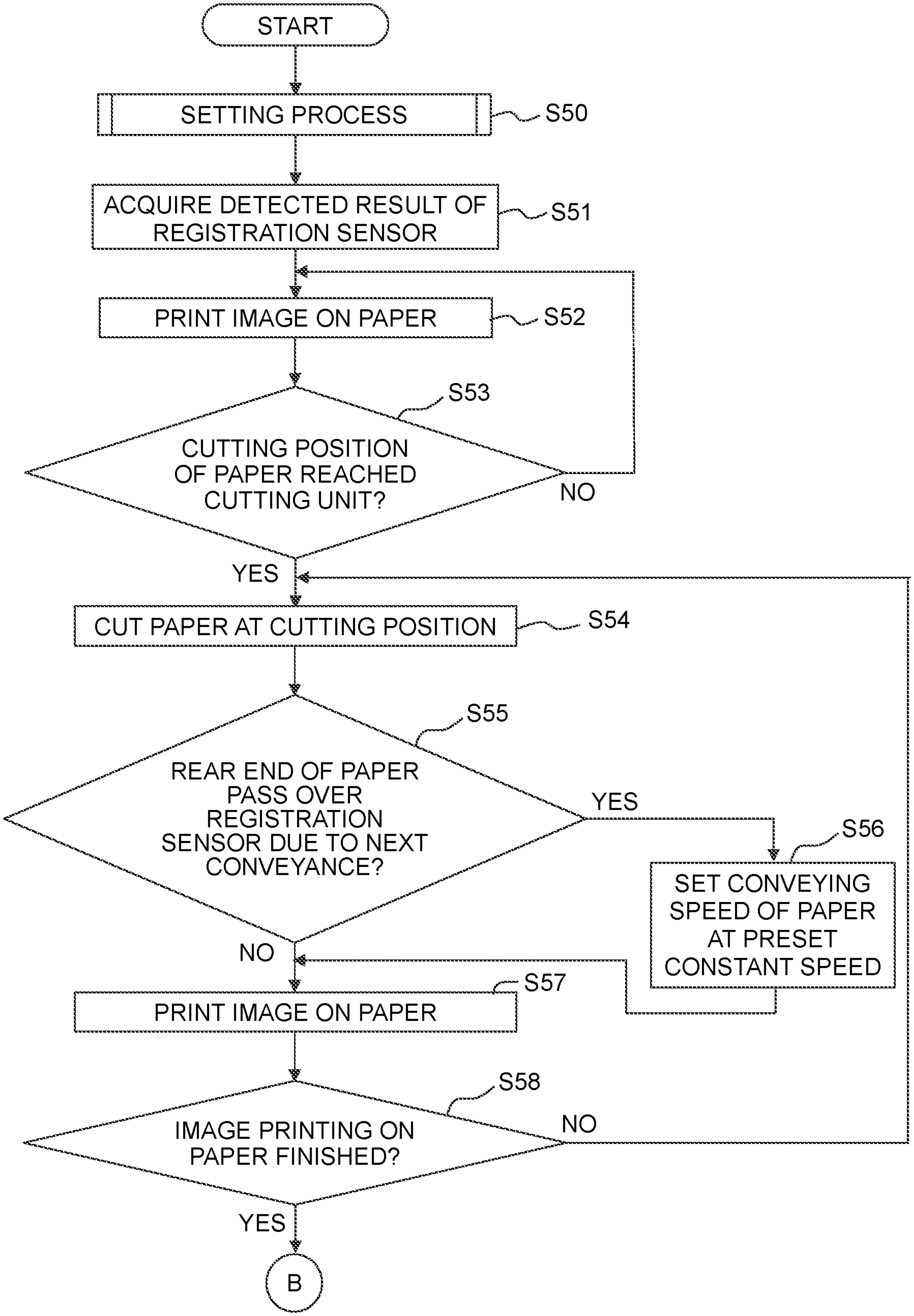
FIGS. 9A and 9B are a flow chart depicting a control flow for the controller of the printing apparatus according to a third embodiment.
Figure 9B:
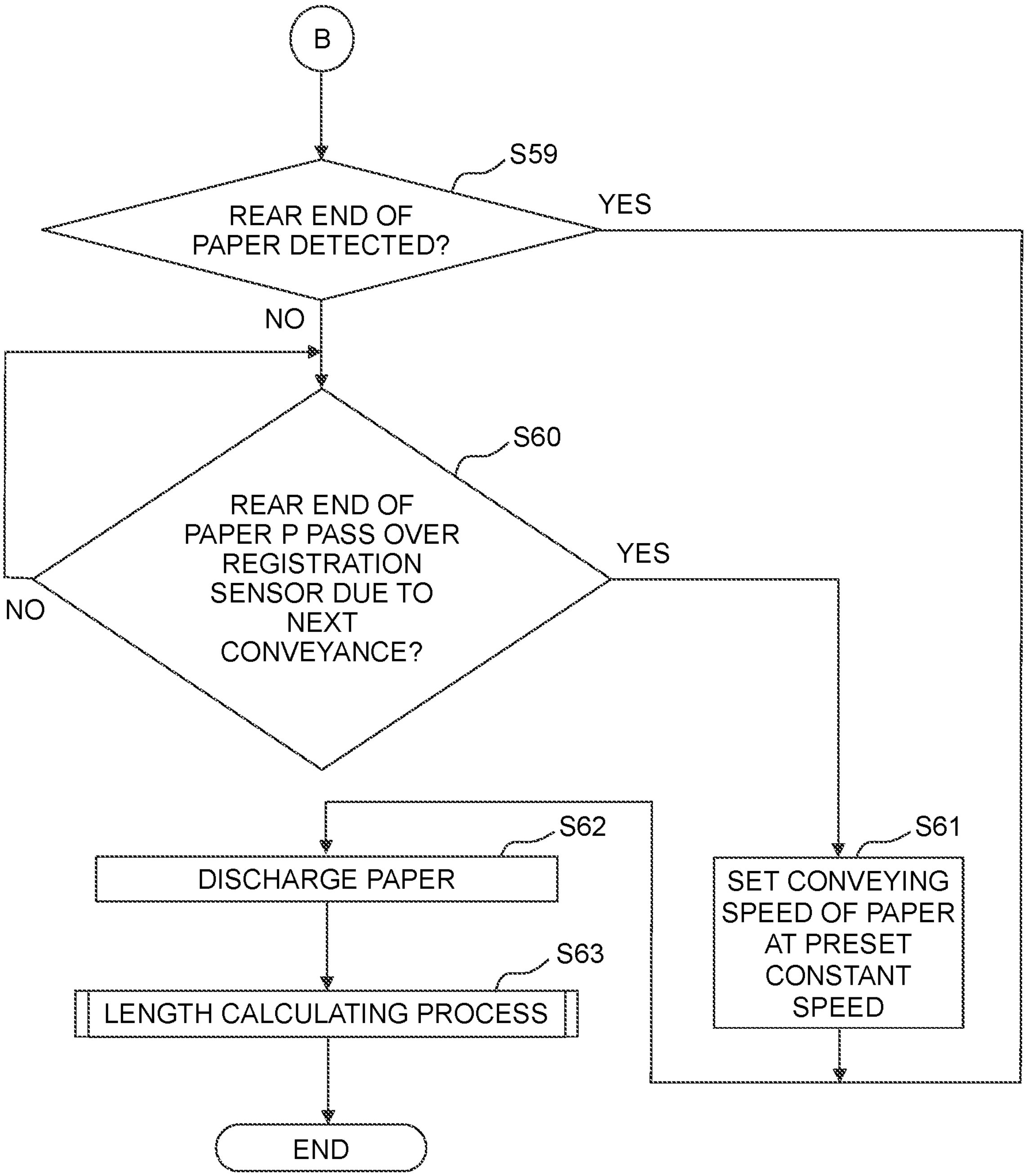

FIGS. 9A and 9B are a flow chart depicting a control flow for the printing apparatus 1 to carry out a printing process on the paper P, being different from the first embodiment in that a constant speed is preset as the speed of conveying the paper P when the rear end of the paper P departs from the position of the registration sensor 120.

From the step S50 to the step S54 in FIG. 9A, the controller 100 carries out the same process as that from the step S1 to the step S5 in FIG. 5. In the step S54, the controller 100 carries out the step S55 in the same manner as in the step S5 of FIG. 5 after the paper P is cut at the cutting position CL.

In the step S55, the controller 100 determines whether or not the rear end of the paper P will pass over the position of the registration sensor 120 due to the next returning process. The controller 100 determines that the rear end of the paper P will pass over the position of the registration sensor 120 due to the next returning process if the conveyance distance A of the paper P acquired from the rotary encoder 121 after the next returning process exceeds the average paper length Lave.

If the rear end of the paper P passes over the position of the registration sensor 120 due to the next returning process (S55: Yes), then the controller 100 carries out a speed controlling process to control the conveyance motor 108 for the speed of conveying the paper P to be a preset constant speed v1 (S56). The constant speed v1 is set to be slower than the speed of conveying the paper P in the processing from the step S50 to the step S54. By maintaining the speed of conveying the paper P at the constant speed v1, it is possible to raise the precision of the result of the registration sensor 120 detecting the rear end of the paper P. On setting the speed of conveying the paper P at the speed v1, the controller 100 causes the next line of the image to be printed on the paper P (S57). On the other hand, if the rear end of the paper P does not pass over the position of the registration sensor 120 due to the next returning process (S55: No), then the controller 100 causes the printing unit 3 to print the next line of the image on the paper P in the step S57 without going through the step S56.

After the step S57, the controller 100 carries out the step S58. In the step S58, the controller 100 determines whether or not the paper P is finished with the printing. The controller 100 repeats the process from the step S55 to the step S57 until the paper P is finished with the printing (S58: No). If the paper P is finished with the printing (S58: Yes), then the step S59 is carried out.

In the step S59, the controller 100 determines whether or not the rear end of the paper P has passed over the position of the registration sensor 120. If the rear end of the paper P has passed over the position of the registration sensor 120 before the paper P is finished with the printing (S59: Yes), then the controller 100 carries out the step S62. On the other hand, if the rear end of the paper P has not passed over the position of the registration sensor 120 before the paper P is finished with the printing (S59: No), then the controller 100 carries out the step S60. In the step S60, the controller 100 determines whether or not the rear end of the paper P will pass over the position of the registration sensor 120 due to the next returning process. The controller 100 repeats the returning process until determining that the rear end of the paper P will pass over the position of the registration sensor 120 due to the next returning process (step S60: No). If the controller 100 determines that the rear end of the paper P will pass over the position of the registration sensor 120 due to the next returning process (S60: Yes), then the step S61 is carried out. In the step S61, the controller 100 sets the speed of conveying the paper P at the speed v1, in the same manner as in the step S56. The following process from the step S62 is the same as that from the step S8 in FIG. 5.

According to the above configuration, at the timing of the rear end of the paper P passing over the registration sensor 120, the paper P is conveyed at the predetermined constant speed v1. Therefore, it is possible for the registration sensor 120 to readily detect the passage of the rear end of the paper P. By virtue of this, it is possible to raise the precision of the result of the registration sensor 120 detecting the front end and the rear end of the paper P.

OTHER EMBODIMENTS

In the above first to third embodiments, if a predetermined condition is satisfied, then the controller 100 may further carry out a resetting process to reset the cutting position CL set in the setting process to the default processing position Cdef. The expression "a predetermined condition is satisfied" refers to, for example, the feeding tray 21 being removed from the opening 20 of the printing apparatus 1, or the feeding tray 21 being installed into the opening 20.

The controller 100 may let the installation sensor 123 detect the feeding tray 21 being installed in the printing apparatus 1 but, if the feeding tray 21 is removed from the printing apparatus 1, may reset the cutting position CL to the default processing position Cdef. The controller 100 may let the installation sensor 123 detect the feeding tray 21 being installed in the opening 20 but, if the feeding tray 21 switches from the state of being removed from the opening 20 to the state of being installed in the opening 20, may reset the cutting position CL to the default processing position Cdef. When the cutting position CL is reset to the default processing position Cdef, the controller 100 may delete the data of the paper lengths L stored before the resetting such that the paper lengths L stored in the EEPROM 104 may not be used in setting the cutting position CL until the timing comes for the resetting. By carrying out the resetting process on the basis of the feeding tray 21 being removed or installed, it is possible to set the cutting position CL according to a change in the paper type or manufacturing lot of the paper P along with replacing the paper P accommodated in the feeding tray 21 or resupplying the same.

Further, as another example of a predetermined condition being satisfied, for example, the resetting process may be carried out if the paper P accommodated in the feeding tray 21 is used up. The cutting position CL may be reset to the default processing position Cdef if the feeding tray 21 is removed from the opening 20 after an optical sensor (the third detector) detects whether or not the paper P is accommodated in the feeding tray 21.

Further, as still another example of a predetermined condition being satisfied, the resetting process may be carried out if the user uses the input interface 124 to input a setting for the size of the paper P. If the input interface 124 is used to input a setting for the size of the paper P, then there is a high possibility of a change in the paper type or manufacturing lot of the paper P accommodated in the feeding tray 21, such that the resetting process may be carried out.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

MODIFICATIONS

In the above first to third embodiments, the explanation was made with a case of carrying out a cutting process to cut the paper P into the halves of the first paper P1 and the second paper P2. However, without being limited to the case of cutting the paper P into halves, the controller 100 may use the cutting unit 10 to cut the paper P into three parts of an equal size. Further, the paper P may be cut into a number of pieces more than three. In such cases, the aforementioned cutting process shall be carried out repetitively according to the divided number.

In the above first to third embodiments, the cutting unit 10 is provided at the downstream side of the printing unit 3 in the first conveyance direction D1. However, without being limited to that position, the cutting unit 10 may be provided, for example, at the upstream side of the printing unit 3 in the first conveyance direction D1, or provided as an adjusting device outside of the printing apparatus 1.

In the above first to third embodiments, the cutting position CL is set by way of calculating an average value of a plurality of paper lengths L, i.e., the average paper length Lave, and using the average paper length Lave. However, without being limited to that, for example, the cutting position CL may be set by way of calculating a mean value or the most frequent value of a plurality of paper lengths L, and using the calculated result.

In the above first to third embodiments, the registration sensor 120 is used to detect the front end and the rear end of the paper P. However, the method for detecting the front end and the rear end of the paper P is not limited to the registration sensor 120 only but, for example, the media sensor 122 may be used as the first detector to detect the front end and the rear end of the paper P. Further, the registration sensor 120 and the media sensor 122 may be combined in usage as the first detector where the media sensor 122 detects the front end of the paper P while the registration sensor 120 detects the rear end of the paper P.

In the above second embodiment, the controller 100 carries out the setting process before conveying the paper P, and carries out the length calculating process after the paper P is finished with printing. However, when double side printing is carried out, the timing of carrying out the setting process or the length calculating process is not limited to the timing only exemplified in FIGS. 8A and 8B. For example, after the rear end of the paper P passes over the position of the registration sensor 120, the length calculating process and the setting process may be carried out in order before cutting the paper P. By virtue of this, it is possible to set the cutting position CL on the basis of the results of measuring the paper lengths L from the first page of the paper P.

In the above first to third embodiments and respective modifications, the cutting position CL is set in the paper P and the cutting unit 10 carries out the cutting process. However, processes on a print medium such as the paper P and the like are not limited to the cutting process alone. For example, a perforating process or a crease forming process may be carried out on the paper P. If a perforating process is carried out, for example, then the controller 100 sets a processing position for the perforating process by the same process as for the cutting position CL. Then, the controller 100 causes a processing member, i.e., a perforation cutter to contact with that processing position. Then, by moving the perforation cutter in a width direction of the paper P, the perforating process may be carried out. In the same manner for a crease forming process, the controller 100 sets a processing position by the same process as for the cutting position CL, to carry out the crease forming process at the processing position. In the crease forming process, a blade serving as the processing member to form the crease is caused to contact with the paper P, and the blade is to be moved in a width direction of the paper P.

The present disclosure is not limited to the respective embodiments described above but may undergo various changes within the scope set forth in the appended claims. The technique scope of the present disclosure also includes any embodiments obtained by appropriately combining the technique means disclosed respectively in the different embodiments.

What is claimed is:

1. A printing apparatus comprising:
a holder configured to hold a plurality of printing media;
a conveying unit configured to convey each of the printing media picked up from the holder, along a conveyance direction;
a printing unit configured to print an image on each of the printing media according to a print data included in a print job;
a first detecting unit configured to detect a front end and a rear end in the conveyance direction of each of the printing media conveyed by the conveying unit;
a processing unit configured to process each of the printing media conveyed by the conveying unit, by moving a processing member with the processing member contacting each of the printing media; and
a controller configured to:
calculate lengths of the printing media by using detected results by the first detecting unit, each of the lengths being a length in the conveyance direction of one of the printing media; and
based on the lengths of the printing media, set a processing position in the conveyance direction at which the processing unit processes each of the printing media.

2. The printing apparatus according to claim 1, wherein the controller is configured to set the processing position based on an average value of the lengths of the printing media.

3. The printing apparatus according to claim 2, wherein in a case that a number of the lengths of the printing media is equal to or less than a predetermined number, the controller is configured to set the processing position based on the lengths of the printing media and a preset length for a printing medium size designated in the print job.

4. The printing apparatus according to claim 2, wherein in a case that one of the lengths of the printing media is not included in a preset range, the controller is configured to set the processing position without using the one of the lengths of the printing media.

5. The printing apparatus according to claim 1, wherein in a case that the processing position is not included in a preset adjusting range, the controller is configured to set the processing position at one of an upper limit position of the preset adjusting range and a lower limit position of the preset adjusting range.

6. The printing apparatus according to claim 1, wherein in a case that a predetermined condition is satisfied, the controller is configured to set the processing position at a predetermined default processing position.

7. The printing apparatus according to claim 6, further comprising a second detecting unit configured to detect whether the holder is installed in the printing apparatus, wherein the predetermined condition is that the second detecting unit detects uninstallation of the holder in the printing apparatus.

8. The printing apparatus according to claim 6, further comprising a second detecting unit configured to detect whether the holder is installed in the printing apparatus, wherein the predetermined condition is that the second detecting unit detects installation of the holder in the printing apparatus.

9. The printing apparatus according to claim 6, further comprising a third detecting unit configured to detect whether the holder holds at least one of the printing media, wherein the predetermined condition is that the third detecting unit detects that the holder does not hold the at least one of the printing media.

10. The printing apparatus according to claim 6, further comprising an input interface configured to receive an input from a user for a size of the printing media, wherein the predetermined condition is that the input interface receives the input for the size of the printing media.

11. The printing apparatus according to claim 1, wherein the controller is configured to correct each of the lengths of the printing media by referring to a conveyance speed of each of the printing media passing through the first detecting unit.

12. The printing apparatus according to claim 1, wherein the controller is configured to control the conveying unit such that a conveyance speed of each of the printing media is a predetermined speed at a timing of the rear end of each of the printing media passing through the first detecting unit.

* * * * *